United States Patent Office 3,098,877 Patented July 23, 1963

1

3,098,877

PRODUCTION OF ALKYLATED DECABORANES

Murray S. Cohen, Dover, and Carl E. Pearl, Morristown, N.J., assignors, by mesne assignments, to Thiokol Chemical Corporation, a corporation of Delaware No Drawing. Filed July 1, 1955, Ser. No. 519,624
11 Claims. (Cl. 260—606.5)

This invention relates to the manufacture of liquid mono and polyalkyl decaboranes.

More particularly it relates to the manufacture of alkyl decarboranes by the treatment of decaborane in a non-reactive solvent with a metal alkyl and a dialkyl sulfate. The order of addition is critical and the reaction should be carried out in two stages. In the first stage of the process of the present invention, the metal alkyl, suitably dissolved in a non-reactive solvent, is added to decaborane dissolved in similar or different non-reactive solvent. Alternatively, the reagents of the first step can be combined in the reverse order. In either case, from about 0.5 to 3 moles of metal alkyl are used per mole of decaborane. When monoalkyl decaboranes are desired, approximately one mole of metal alkyl per mole of decaborane is preferably used. The proportion of metal alkyl can be reduced to about 0.5 or less when the monoalkyl derivative is the preferred product but lower conversions must suffice. When the production of mixed polyalkyl decaboranes is preferred, larger proportions of the metal alkyl, up to about 3 moles or more per mole of decaborane, can be used.

During the reaction some gas evolution occurs and the gas is largely the alkane derived from the metal alkyl. In starting the reaction it is advantageous to maintain an inert atmosphere over the reactants. For this purpose any nonreactive gas can be used including nitrogen or argon. The reaction occurs without substantial evolution of heat and proceeds rapidly at atmospheric temperature. Generally, the reaction temperature will be within the range from −70 to 100° C.

In the second stage of the reaction a suitable alkyl sulfate is added to the primary reaction product. Preferably the proportion of alkyl sulfate is about one mole per mole of decaborane initially used but this can vary from about 0.5 to 5 moles of alkyl sulfate. When the monoalkyl decaborane is the desired product, not over one mole of alkyl sulfate per mole of metal alkyl is preferably used and this can be as low as 0.5 mole or less. No significant improvement in yield appears to result from the use of these larger proportions but the yield may be reduced by the use of proportions much lower than 1:1.

The alkyl sulfate is suitably added in solution in an inert solvent which can be the same or different from that used in the initial stage of the reaction provided it is non-reactive with metal alkyls. The addition can be carried out at any temperature between −70 and 100° C. but preferably at about −10 to 30° C. The inert gaseous atmosphere used in the first stage is preferably continued in the second stage. Advantageously the reaction mixture is refluxed after the alkyl sulfate has been added in order to improve the yield. A short reaction time of one hour or less appears to be sufficient but the yield is somewhat improved by longer periods of reflux, for example, up to 18 hours or more.

After completion of the reaction the product in solution in the organic solvent is removed from the inorganic solids, for example, by filtration or decantation. The latter are advantageously extracted with additional quantities of solvent and the extracts are combined with the original solution. The alkylated product is recovered by distillation of the solvents from the combined extracts.

2

Suitably the alkyl decaborane residue is vacuum distilled.

Suitable metal alkyls are prepared in known manner, for example, from the alkyl halide and metal in anhydrous ether or by any other suitable method. Examples of suitable metal alkyls, generally alkali metal alkyls, include those containing not more than five carbon atoms in each alkyl radical, e.g., methyl lithium, ethyl lithium, n-butyl sodium, diethyl magnesium and methyl magnesium bromide. Thus by the term metal alkyls we mean to include the dialkyl magnesium compounds and the Grignard reagents as well as alkali metal alkyls.

Alkyl sulfates containing not more than five carbon atoms in each alkyl radical generally are suitable for use in the reaction of this invention. Methyl sulfate and ethyl sulfate are particularly convenient and useful but other higher alkyl sulfates can be used.

The process of the present invention is carried out in a suitable solvent which does not react with metal alkyls or boron hydrides. Saturated hydrocarbons including aliphatic hydrocarbons, for example, n-pentane, isooctane or 2,2,4-trimethylpentane, can be used. Ethers sufficiently stable to metal alkyls, including lower dialkyl ethers such as diethyl ether, dimethyl ether, methyl ethyl ether and diisopropyl ether and tetrahydrofurane and morpholine are suitable. Alicyclic and aromatic hydrocarbons, including lower alkyl benzenes are also useful including benzene, toluene, xylene, ethylbenzene, cyclohexane, methyl cyclopentane and other alicyclic hydrocarbons.

The process of the present invention has the advantage that substantially atmospheric pressures and substantially atmospheric temperatures can be used and no dangerous pressures are formed provided the by-product gases are suitably vented from the reaction vessel.

*Example I*

In a 1-liter, three-necked flask equipped with a Dry-Ice cold finger, true-bore mechanical stirrer, thermometer and dropping funnel all under a head of pure, dry argon was placed 42.5 g. (0.348 mole) of decaborane dissolved in 300 ml. of ether. While the reaction mixture was maintained at −75° C., 0.348 mole of ethyl lithium in 255 ml. of ether was added during a period of one hour. No gas evolution was observed and the reaction mixture was held at this temperature for four hours. When the solution was allowed to come to room temperature still no gas was observed. A solution of 44.0 g. (0.348 mole) of dimethyl sulfate in 100 ml. of ether was then added at −10° and the reaction mixture was then brought to reflux temperature. At this point 1.7 liters of gas was evolved. The heating was continued for eighteen hours. The solution was decanted from the inorganic salts which were washed twice with 100 ml. portions of benzene. The washings and extract were distilled at atmospheric pressure and the residues combined and distilled in vacuo. The resulting liquid mixture of methyl and ethyl decaboranes containing some unreacted decaborane weighed 17.0 g. and boiled at 64–85° C. at 0.3 mm. The methyl and ethyl decaboranes can be isolated by further fractionation, if desired.

*Example II*

In an apparatus similar to that described in Example I was added 30.5 g. (0.25 mole) of decaborane and 200 ml. of dry benzene. This was refluxed during a period of 1.5 hours while a solution of 0.25 mole of ethyl lithium in 660 ml. of m-pentane was added. After refluxing for one additional hour the solution was cooled to 20° C. and a solution of 31.6 g. (0.25 mole) of dimethyl sulfate in 50 ml. of benzene was added during a period of 15 minutes. The mixture was refluxed for 3.25 hours and cooled. The solution was decanted from the inorganic salts which were washed twice with 100 ml. portions of benzene. The washings, combined with the extract, were distilled at atmospheric pressure and the residue distilled in vacuo. The resulting liquid mixture of methyl and ethyl decaboranes, 20.4 g., containing some unreacted decaborane, was identified by its infrared spectrum and boiled at 49–68° C. at 0.5 mm. If desired, the methyl and ethyl decaborane can be further purified by fractionation.

*Example III*

In an apparatus similar to that used in Example I was placed 56.4 g. (0.46 mole) of decaborane and 300 ml. of dry ether. The solution was cooled and maintained at —10° C. while a solution of 0.46 mole of methyl lithium in 210 ml. of dry ether was added during a period of 0.5 hour. The mixture was refluxed for 0.25 hour and again cooled to —10° C. while a solution of 35.5 g. (0.230 mole) of diethyl sulfate dissolved in 100 ml. of dry ether was added. The mixture was refluxed for 16 hours and the ether was then removed by distillation while adding dry benzene to displace it. The vapor temperature climbed slowly to 78° C. When the displacement was complete, the mixture was cooled and the benzene solution was decanted. The solid was washed with 100 ml. of dry benzene and the washings combined with the decanted portion. Benzene was removed by distillation at atmospheric pressure and the residue was distilled in vacuo. The 5.8 grams of liquid methyl decaborane product contained about 15 percent of unreacted decaborane and boiled at 57–69° C. at 0.4 mm. The methyl decaborane can be purified by further fractionation, if desired.

*Example IV*

In an apparatus similar to that described in Example I, was placed a solution 40.8 g. (0.334 mole) of decaborane in 300 ml. of ether. While the decaborane solution was stirred at —5 to —10° C., 0.334 mole of ethyl lithium in 194 ml. of ether was added during 0.75 hour. Various color changes occurred, accompanied by the evolution of ethane gas. At the completion of the addition of ethyl lithium, a solution containing 25.4 g. (0.165 mole) of ethyl sulfate in 100 ml. of ether was added. The temperature was maintained at —5 to —10° C. during the 0.5 hour period of addition. Some gas evolution occurred during the addition. The solution, now deep green in color, was heated under reflux for 15 hours. All but 100 ml. of ether was removed by distillation and 700 ml. of benzene was added. This mixture was distilled slowly for an hour during which time the temperature of the distilling vapors rose to 77° C. An additional 500 ml. of benzene was added and the clear supernatant solution was removed from the white precipitate by decantation. Distillation of this benzene extract yielded a fraction of liquid ethyl decaboranes weighing 11.4 g. and boiling at 73–101° C. at 0.9 mm. An additional 1.1 g. of ethyl decaboranes boiling at 76–95° C. at 2.0 mm. was obtained by extraction of the white solid with a second portion of benzene and distillation of the extract.

*Example V*

During 0.75 hour, a solution of 0.47 mole of ethyl magnesium bromide in 200 ml. of ethyl ether was added to a solution of 0.24 mole of decaborane in 300 ml. of ether. The mixture was refluxed during the addition and for an additional hour. During the next hour a solution of 0.24 mole of dimethyl sulfate in 150 ml. of ether was added at the reflux temperature. The ether was removed by distillation and continuously replaced by 400 ml. of benzene. When the vapor temperature reached 78° C., the mixture was cooled and decanted from the insoluble solids. Distillation of the solution gave 1.4 g. of liquid product boiling at 51–66° C. at 0.5 mm. and contained 50 percent to 60 percent of methyl decaborane. If desired, the methyl and ethyl decaboranes can be further purified by additional fractionation.

The compositions produced in accordance with our invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The compositions produced in accordance with our invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15:1 or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch at static sea level conditions to about 5 to 15 pounds per square inch absolute at the extremely high altitudes of approximately 70,000 feet. The products produced in accordance with our invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon produced in accordance with the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels produced in accordance with the present invention, the local fuel to air ratio in the zone of fuel injection should also be approximately stoichiometric, assuming that the boron, carbon and hydrogen present in the products burn to boric oxide, carbon dioxide and water vapor. In the case of the liquid ethyl decaborane, containing about 72 percent by weight of boron, for example, this local fuel to air ratio by weight is approximately 0.072. For the higher energy fuels produced in accordance with the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the products produced in accordance with the present invention are employed in essentially the same manner as the simple hydrocarbon fuel presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Presentday turbine blade materials limit the turbine inlet temperature to approximately 1600–1650° F. Operations at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The products produced in accordance with our invention can also be employed as aircraft gas turbine fuels in admixture with the hydrocarbons presently being used, such as JP–4. When such mixtures are used, the fuel-air ratio in the zone of the combustor where combustion is initiated and the overall fuel-air ratio across the combustor will be proportional to the relative amounts of borohydrocarbon and hydrocarbon fuel present in the mixture, and consistent with the air dilution required to maintain the gas temperatures of these mixtures within accepted turbine operating temperatures.

Because of their high chemical reactivity and heating values, the products produced in accordance with our invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme conditions of altitude operations with conventional aircraft fuels.

The burning characteristics of the products produced in accordance with our invention are such that good combustion performance can be attained even at the marginal operating conditions encountered at high altitudes, insuring efficient and stable combustion and improvement in the zone of operation before lean and rich extinction of the combustion process is encountered. Significant improvements in the non-afterburning performance of a gas turbine-afterburning combination is also possible because the high chemical reactivity of the products produced in accordance with our invention eliminates the need of flameholding devices within the combustion zone of the afterburner. When employed in an afterburner, the fuels produced in accordance with our invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The products produced in accordance with our invention will improve the combustion process of the ramjet in much the same manner as that described for the afterburner because of their improved chemical reactivity over that of simple hydrocarbon fuels. When employed in a ramjet the fuels produced in accordance with our invention will be simply substituted for hydrocarbon fuels and used in the established manner.

We claim:

1. A method for the preparation of a liquid alkyldecaborane which comprises reacting decaborane and from 0.5 to 3 moles, per mole of decaborane, of a metal alkyl selected from the group consisting of alkali metal alkyls containing from 1 to 5 carbon atoms, magnesium dialkyls containing not more than 5 carbon atoms and alkyl magnesium monohalides containing from 1 to 5 carbon atoms at a temperature of −70 to 100° C. while the decaborane is in solution in an organic solvent which is inert under the reaction conditions, adding from 0.5 to 5 moles, per mole of decaborane, of a dialkyl sulfate containing from 1 to 5 carbon atoms in each alkyl radical to the reaction mixture and continuing the reaction at a temperature of −70 to 100° C.

2. The method of claim 1 wherein the metal alkyl is an alkali metal alkyl.

3. The method of claim 1 wherein said alkali metal alkyl is methyl lithium.

4. The method of claim 1 wherein the alkali metal alkyl is ethyl lithium.

5. The method of claim 1 wherein the dialkyl sulfate is dimethyl sulfate.

6. The method of claim 1 wherein the dialkyl sulfate is diethyl sulfate.

7. The method of claim 1 wherein said solvent is a lower dialkyl ether.

8. The method of claim 1 wherein said solvent is benzene.

9. The method of claim 1 wherein said metal alkyl is ethyl lithium and wherein said dialkyl sulfate is dimethyl sulfate.

10. The method of claim 1 wherein said metal alkyl is methyl lithium and wherein said dialkyl sulfate is diethyl sulfate.

11. The method of claim 1 wherein said metal alkyl is ethyl lithium and wherein said dialkyl sulfate is diethyl sulfate.

No references cited.